(12) United States Patent
Bierhuizen et al.

(10) Patent No.: US 7,543,959 B2
(45) Date of Patent: Jun. 9, 2009

(54) ILLUMINATION SYSTEM WITH OPTICAL CONCENTRATOR AND WAVELENGTH CONVERTING ELEMENT

(75) Inventors: Serge J. Bierhuizen, Milpitas, CA (US); Gerard Harbers, Sunnyvale, CA (US)

(73) Assignee: Philips Lumiled Lighting Company, LLC, San Jose, CA (US)

( * ) Notice: Subject to any disclaimer, the term of this patent is extended or adjusted under 35 U.S.C. 154(b) by 22 days.

(21) Appl. No.: 11/248,945

(22) Filed: Oct. 11, 2005

(65) Prior Publication Data

US 2007/0081336 A1  Apr. 12, 2007

(51) Int. Cl.
*F21V 9/00* (2006.01)

(52) U.S. Cl. .......................... 362/293; 257/98
(58) Field of Classification Search ................ 362/293, 362/583, 327, 297, 510; 257/98
See application file for complete search history.

(56) References Cited

U.S. PATENT DOCUMENTS

| | | | | |
|---|---|---|---|---|
| 4,240,692 | A | 12/1980 | Winston | 350/96 |
| 5,622,418 | A * | 4/1997 | Daijogo et al. | 353/97 |
| 5,727,108 | A * | 3/1998 | Hed | 385/133 |
| 6,133,589 | A | 10/2000 | Krames et al. | 257/103 |
| 6,274,399 | B1 | 8/2001 | Kern et al. | 438/22 |
| 6,274,924 | B1 | 8/2001 | Carey et al. | 257/676 |
| 6,291,839 | B1 | 9/2001 | Lester | 257/91 |
| 6,364,487 | B1 * | 4/2002 | Weber et al. | 353/30 |
| 6,525,335 | B1 | 2/2003 | Krames et al. | 257/13 |
| 6,576,488 | B2 | 6/2003 | Collins, III et al. | 438/29 |
| 6,649,440 | B1 | 11/2003 | Krames et al. | 438/47 |
| 6,737,809 | B2 | 5/2004 | Espiau et al. | 315/39 |
| 6,869,206 | B2 * | 3/2005 | Zimmerman et al. | 362/310 |
| 6,885,035 | B2 | 4/2005 | Bhat et al. | 257/99 |
| 6,922,021 | B2 | 7/2005 | Espiau et al. | 315/248 |
| 7,070,300 | B2 * | 7/2006 | Harbers et al. | 362/231 |
| 7,127,141 | B2 * | 10/2006 | Fein | 385/39 |
| 2001/0035720 | A1 * | 11/2001 | Guthrie et al. | 315/39 |
| 2005/0099130 | A1 | 5/2005 | Espiau et al. | 315/39 |
| 2005/0205883 | A1 | 9/2005 | Wierer, Jr. et al. | 257/98 |
| 2005/0212456 | A1 | 9/2005 | Espiau et al. | 315/248 |
| 2005/0224826 | A1 * | 10/2005 | Keuper et al. | 257/98 |

OTHER PUBLICATIONS

H. De. Neve et al., "Recycling of guided mode light emission in planar microcavity light emitting diodes", Appl. Phys. Lett. 70(7), 1997, pp. 799-801.

U.S. Appl. No. 10/804,314, entitled "Optical System for Light Emitting Diodes" by Matthijs H. Keuper et al., filed Mar. 19, 2004.

* cited by examiner

*Primary Examiner*—Briggitte R Hammond
*Assistant Examiner*—Vanessa Girardi

(57) ABSTRACT

A light emitting device includes a light emitting element, an optical concentrator, such as a compound parabolic concentrator, a dichroic filter between the light emitting element and the optical concentrator and a wavelength converting material, such as a phosphor. The optical concentrator receives light from the light emitting element, via the dichroic filter, and emits the light from an exit surface, which is smaller than the entrance surface. The optical concentrator may be manufactured from a material with a high refractive index, such as sapphire. The wavelength converting material is, e.g., disposed over the exit surface. The radiance of the wavelength converting material is increased by pumping the wavelength converting material through a high index of refraction material and outputting the converted light into a low refractive index medium, such as air.

49 Claims, 3 Drawing Sheets

ILLUMINATION SYSTEM WITH OPTICAL CONCENTRATOR AND WAVELENGTH CONVERTING ELEMENT

FIELD OF THE INVENTION

The present invention relates generally to light emitting devices and in particular to high-radiance optical systems.

BACKGROUND

Certain optical systems, such as projection systems and automobile headlights, require light sources with high radiance or luminance. Until recently, the luminance of conventional light emitting diodes (LEDs) was inadequate to fulfill the needs for such applications. However, even with current high performance LEDs, the radiance requirement for some optical systems is difficult to fulfill. Moreover, in comparison to high intensity discharge lamps, the luminance of LEDs is typically too low. This is particularly true in systems that convert light emitted from LEDs, e.g., using phosphor, to other wavelengths in order to produce white light. Such conversion typically results in a loss of radiance rendering such systems unacceptable for high brightness applications.

Thus, what is needed is an improved high radiance optical system.

SUMMARY

In accordance with an embodiment of the present invention, a light emitting device includes a light emitting element, such as a light emitting diode (LED), LED array or plasma light source, an optical concentrator, such as a compound parabolic concentrator, a dichroic filter between the light emitting element and the optical concentrator and a wavelength converting material, such as a phosphor. The optical concentrator receives light from the light emitting element, via the dichroic filter, and emits the light from an exit surface, which is smaller than the entrance surface. The optical concentrator may be manufactured from a material with a high refractive index, such as F2, B270, SF10, SF57 or BK7 glass, sapphire, or plastics such as Zeonex or Ultem. The wavelength converting material is mounted on the exit surface and directly or indirectly emits converted light into a medium that has a relatively low refractive index. The radiance of the wavelength converting material is increased by pumping the wavelength converting material through a high index of refraction material and outputting the converted light into a low refractive index medium, such as air. By way of example, where the optical concentrator is formed from sapphire and the wavelength converting material emits light into air, a gain of approximately 3× can be obtained.

DETAILED DESCRIPTION

In accordance with an embodiment of the present invention, the luminance or radiance of an optical system is improved by pumping a wavelength converting element, such as phosphor, through an optical concentrator with a high refractive index and producing the generated (converted) light through a low refractive index medium, such as air.

Figure 1:
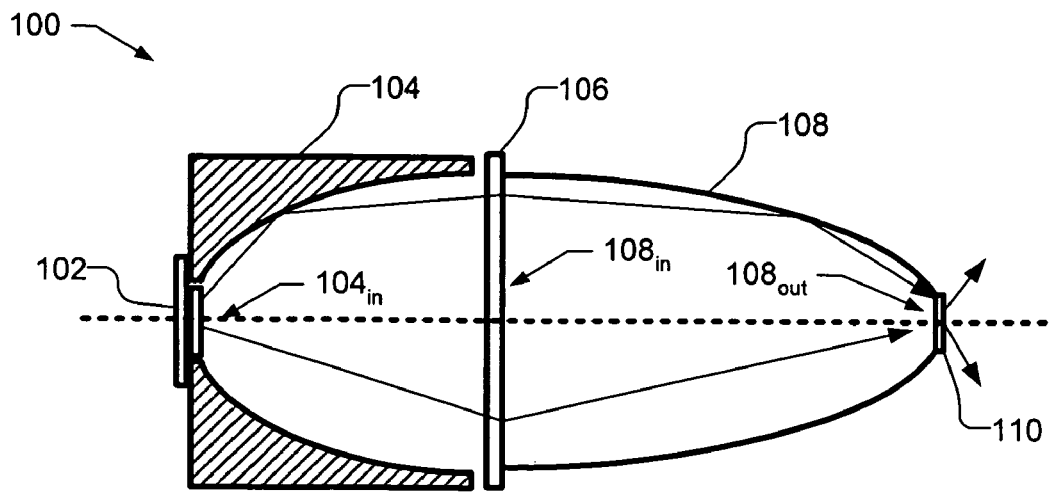
FIG. 1 illustrates an optical system in accordance with an embodiment of the present invention.

FIG. 1 illustrates an optical system 100 in accordance with an embodiment of the present invention. Optical system 100 includes a light emitting device 102, illustrated as a light emitting diode (LED) or LED array on a substrate, and a collection optic 104. The collection optic 104 reduces the cone angle of the emission pattern from the light emitting device 102. By way of example, the collection optic 104 can reduce a ±90° emission cone from the light emitting device 102 to a ±30° angular emission pattern. The collection optic 104 may be, e.g., a rectangular angle transformer, a compound parabolic concentrator (CPC), a condenser lens, a Fresnel lens, a lens using sections of total internal reflection surfaces (TIR), or any other appropriate device. In some embodiments, as described below, the collection optic 104 may be eliminated. An optical concentrator 108 receives the light from the collection optic 104 through a dichroic filter 106. In one embodiment, the optical concentrator 108 is a solid compound parabolic concentrator (CPC), but the optical concentrator may take other forms as well. A wavelength converting element 110 is in optical contact with the optical concentrator 108 at the output port. The wavelength converting element 110 may be, e.g., a phosphor platelet that is indexed matched with the optical concentrator 108.

Light emitted from the light emitting device 102 may be ultraviolet or blue light, which is used to pump the wavelength converting element 110. The light emitting device 102 may be formed from, e.g., a high-radiance LED such as that described in, e.g., U.S. patent application Ser. No. 10/804,810, entitled "Photonic Crystal Light Emitting Device, by Jonathan J. Wierer, Jr., Michael R. Krames and John E. Epler, filed on Mar. 19, 2004, and having the same assignee as the present disclosure, which is incorporated herein by reference. Further a resonant cavity LED, which is a one-dimensional photonic crystal device, is described in H. De. Neve et al., "Recycling of guided mode light emission in planar microcavity light emitting diodes", Appl. Phys. Lett. 70(7), 1997, pp. 799-801, which is incorporated herein by reference. Examples of forming LEDs, are described in U.S. Pat. Nos. 6,133,589; 6,274,399; 6,274,924; 6,291,839; 6,525,335; 6,576,488; 6,649,440; and 6,885,035, all of which are incorporated herein by reference. It should be understood, however, that any suitable light emitting diode or other light emitting devices, may be used with the present invention. By way of example, the light emitting device 102 may be a plasma light source, such as that disclosed in U.S. Pat. Nos. 6,922,021 and 6,737,809, and U.S. Publication Nos. 2005/0212456 and 2005/0099130, which are incorporated herein by reference.

Light emitted from the light emitting device 102 is received at the input port $104_{in}$ of the collection optic 104, which reduces the angle of the emission pattern, and the light is transmitted through the dichroic filter 106. The dichroic filter 106 transmits light having wavelengths produced by the light emitting device 102 and reflects light having wavelengths generated by the wavelength converting element 110. Thus, for example, where the wavelength converting element 110 generates green light, the dichroic filter 106 will transmit all the blue or ultraviolet light produced by light emitting device 102 and reflect the green light. The dichroic filter 106 is optically coupled to the large input port 108$_{in}$ of the optical concentrator 108.

The optical concentrator 108 may be formed by producing an optically transparent material with the desired shape. In one embodiment, the optical concentrator 108 is formed from materials having a high refractive index, having a high transmission for both the pump light from the light emitting device 102 and the converted light from the wavelength converting element 110, as well as maintaining its transparency when exposed to light, such as UV, and to heat. Moreover, it is desirable for the material to be suitable for mass production manufacturing techniques, such as molding. In one embodiment, the optical concentrator 108 is formed by materials such as plastic and glass or other appropriate materials, with a high refractive index, such as 1.4 to 1.8 or higher. By way of example, BK7, B270, SF10, SF57 or F2 glass may be used. Sapphire or other materials, such as transparent ceramic or plastics, such as Zeonex or Ultem, may also be used. The superior thermal resistance of sapphire and transparent ceramics is advantageous to enable heat transfer from the wavelength converting element 110. Of course, materials with lower or higher refractive indices may be used if desired. The outer surface of the optical concentrator 108 may be covered with a reflective layer that surrounds an aperture that defines an output port 108$_{out}$. In one embodiment, the reflective layer may be, for example, a metal having a reflectivity greater than 90%. Examples of suitable metals are as silver, aluminum, rhodium, and gold. The reflective metal may be selected based on the material on which it is to be deposited, or the wavelength of the light it is to reflect. For example, gold is highly reflective of light in the red or infra-red wavelength ranges. In addition, a dielectric layer or stack of layers, such as a suitably low index of refraction material, may be positioned between the reflective layer and the optical concentrator 108 in order to reduce optical loss. In another embodiment, the optical concentrator 108 is formed without the use of a reflective material overlying the surfaces of the transparent material. For example, the sidewalls of the transparent material may serve as the reflective surfaces of the optical concentrator 108 when there is total internal reflection. The use of a transparent member with total internal reflection is described in U.S. Pat. No. 4,240,692 to Winston, dated Dec. 23, 1980, which is incorporated herein by reference.

The optical concentrator 108 receives the light that passes through the dichroic filter 106 and concentrates the light onto wavelength converting element 110 on the output port 108$^{out}$. In one embodiment, the etendue of the output port 108$_{out}$ will match the etendue of the input port 104$_{in}$ of the collection optics 104. As is known in the art, etendue is a function of the area of the emitting source and the solid angle that the light beam includes. In the embodiment illustrated in FIG. 1, the light emitted into the collection optic 104 is input in air. Alternatively, the collection optic 104 may be solid and the light is emitted from the light emitting device 102 into air after which it enters the collection optic 104. With the use of a compound parabolic concentrator (CPC) and the input pump beam entering the CPC from the large side through air, an irradiance gain (energy/mm$^2$) of light entering the wavelength converting element 110, thereby increasing the wavelength converted luminance. A luminance gain of $(n_1/n_2)^2$ can theoretically be achieved, where $n_1$ and $n_2$ are the refractive indices on the pump and extraction side of the wavelength converting element 110, respectively. In general, it is desirable for the optical concentrator 108 to have an index of refraction of approximately 1.4 or higher and for the wavelength converting material to generate light directly or indirectly into a medium with an index of refraction of approximately 1.0, such as air. It should be understood that in practice there may be a bonding material between the optical concentrator 108 and the wavelength converting element 110 and a layer over the wavelength converting element 110, such as a protective layer. The bonding material and the protective layer may affect the desired index of refraction of the material on either side of the wavelength converting element 110.

Assuming the refractive index of n=1 for air, the etendue of the input port 104$_{in}$ is given by:

$$E_{in} = \pi \cdot A_{in} \cdot \sin^2 \theta_{in} \qquad \text{eq. 1}$$

where $A_{in}$ is the area of the input port 104$_{in}$ of the collection optics 104 and $\theta_{in}$ is the solid angle into which the light is emitted. The etendue of the output port 108$_{out}$ of the optical concentrator 108 is given by:

$$E_{out} = \pi \cdot n^2 \cdot A_{out} \cdot \sin^2 \theta_{out} \qquad \text{eq. 2}$$

where n is the refractive index of the optical concentrator 108, $A_{out}$ is the area of the output port 108$_{out}$ of the optical concentrator 108 (as well as the area of the wavelength converting element 110), and $\theta_{out}$ is the solid angle into which the light is emitted.

Where the collection angle $\theta_{in}$ and the concentration angle $\theta_{out}$ are 90°, the area of the output port 108$_{out}$ is n$^2$ smaller than the area of the input port 104$_{in}$. Thus, when the etendue's of the input port 104$_{in}$ and the output port 108$_{out}$ are matched (in which case a high coupling efficiency can be obtained) a n$^2$ increase in the power density of the pump beam at the wavelength converting element 110 can be obtained. For an air/sapphire configuration this would result in a theoretical gain of almost 3×. The etendue of the output surface 110$_{out}$ of the wavelength converting element 110 emitting the light directly or indirectly into air (n=1) is given by:

$$E_{110} = \pi \cdot A_{out} \cdot \sin^2 \theta_{110} \qquad \text{eq. 3}$$

wherein $\theta_{110}$ is the solid angle into which the light is emitted. Consequently, the etendue is reduced, which results in a high luminance that is beneficial for, e.g., small panel systems. In one embodiment, the etendue at the output surface 110$_{out}$, after the wavelength converting element 110, which emits the light directly or indirectly into air, is smaller than the etendue of the input port 104$_{in}$ of the collection optics 104 or the etendue of the light emitting device 102 where no collection optics 104 are used or where the area $A_{in}$ of the input port 104$_{in}$ is approximately the same as the area of the light emitting device 102.

The wavelength converting element 110 may be formed using, e.g., phosphor. Suitable phosphors may include, but are not limited to: Y3Al5O12:Ce, (Y,Gd)3(Al,Ga)5O12:Ce, (Lu,Y)3Al5O12:Ce, SrS:Eu, SrGa2S4:Eu, (Sr,Ca,Ba)(Al, Ga)2S4:Eu,(Ca,Sr)S:Eu, (Ca,Sr)S:Eu,Mn, (Ca,Sr)S:Ce, (Sr, Ba,Ca)2Si5N8:Eu, (Ba,Sr,Ca)2SiO4:Eu, and (Ca,Sr,Ba) Si2O2N2:Eu. Typically, such phosphors are obtained in powder form and may be deposited on the transparent medium of the optical concentrator 108 by incorporating in a binding medium such as silicone or epoxy and then applying by methods such as screen-printing or dispensing, before curing to set the binder. Alternatively, the phosphor grains can be deposited first, e.g., by electrophoresis, then back infused with the selected binder, and then cured. It may be advantageous to deposit the phosphor on a separate member before attaching it to the transparent medium of the optical concentrator 108. The phosphors may also be employed in solid form, e.g., thin film phosphor, without a binder. The solid phosphor layer may be deposited on a separate member (e.g., thin film) or may be handled separately and attached directly to the transparent medium of the optical concentrator 108 in the case of a thick solid phosphor film. In addition to phosphors, other luminescent materials may be used in accordance with an embodiment of the present invention, such as organic luminescent converters, and semiconductor layers and/or semiconductor nano-particles, sometimes referred to as "quantum dots".

In general, with the use of phosphor, the wavelength converting element 110 is able to absorb light at all angles. The pump light from the light emitting device 102 will excite the wavelength converting element 110 and light with lower energy will be produced. The wavelength converting element 110 emits light with a wide solid angle. A portion of the pump light may be transmitted by the wavelength converting element 110 and combined with the lower energy light emitted by the wavelength converting element 110 to form light with a desired range of wavelengths. Alternatively, a dichroic filter may be used over the wavelength converting element 110 to reflect the transmitted pump light back into the wavelength converting element 110 for a second pass. It should be understood that a large portion of the light emitted by the wavelength converting element 110 will be directed back to the dichroic filter 106. The dichroic filter 106, however, as discussed above, is configured to reflect the wavelengths of light generated by the wavelength converting element 110. Thus, back emitted light is reflected by the dichroic filter 106 towards wavelength converting element 110. As phosphors have a low absorption, this process can repeat a couple of time to achieve a high luminance and extraction efficiency. In one embodiment, the wavelength converting element 110 may be roughened or may include extraction efficiency enhancing structures either in the wavelength converting element 110 itself or in a protective layer.

Figure 2:
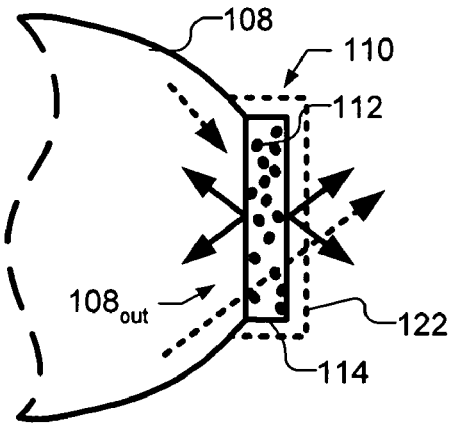
FIG. 2 illustrates a closer view of the output port of the optical concentrator and the wavelength converting element.

FIG. 2 illustrates a closer view of the output port $108_{out}$ of the optical concentrator 108 and the wavelength converting element 110. As illustrated in FIG. 2, the wavelength converting element 110 includes phosphor grains 112 embedded in a transparent film 114 that is attached to the optical concentrator 108. As illustrated in FIG. 2, the pump light, which is e.g., blue or ultraviolet, is concentrated at the wavelength converting element 110. In order to avoid reflection loss at the interface between the optical concentrator 108 and the wavelength converting element 110, the refractive indices of the optical concentrator 108 and the transparent film 114 and the bonding material should be similar. In one embodiment, the index of refraction of the wavelength converting element 110 may be higher than the optical concentrator and any bonding material to ensure that light enters the wavelength converting element 110. The pump light (illustrated by broken arrows) excites the phosphor in the transparent film 114 and light will be radiated in any direction and scattered by the phosphor (illustrated by the solid arrows). As shown in FIG. 2, a portion of the light will be emitted back towards the light emitting device 102, where it will be reflected by the dichroic filter for recycling. Another portion of the converted light will be emitted by the wavelength converting element 110 directly into the air (or other desired medium), where it is combined with pump light that passes through the wavelength converting element 110. In another embodiment, a layer 122 may be disposed over the wavelength converting element 110 as illustrated with dotted lines in FIG. 2. The layer 122 may be, e.g., a protective layer, a diffractive optical element, a hologram element, a dichroic filter, or a reflective polarizer. Thus, the wavelength converting element 110 may produce light that is indirectly emitted into air (or other desired medium) through the layer 122.

Figure 3A:
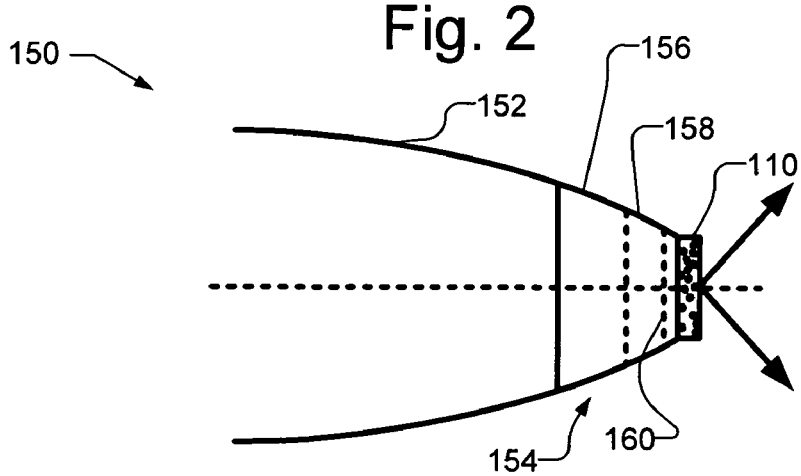
FIGS. 3A and 3B illustrate alternative embodiments of the optical concentrator that may be used with the present invention.
Figure 3B:
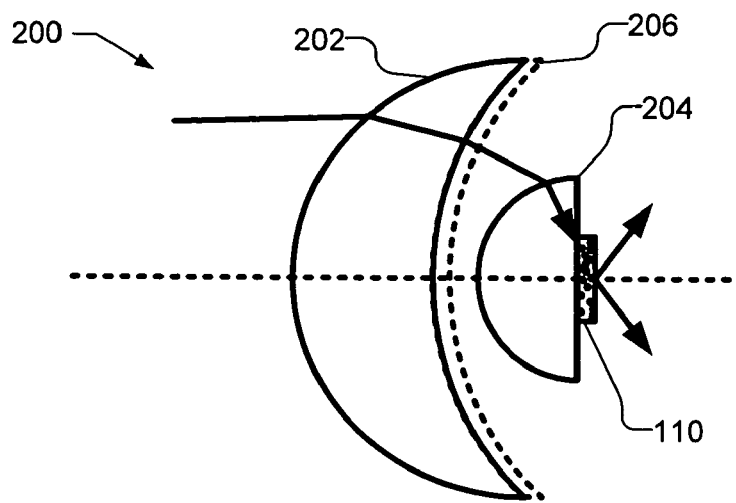

FIGS. 3A and 3B illustrate alternative embodiments of the optical concentrator that may be used with the present invention. As illustrated in FIG. 3A, the optical concentrator 150 includes two stages: a first stage 152 is a reflective (open) CPC and the second stage 154 is a solid CPC, to which is mounted the wavelength converting element 110, as described above in reference to FIGS. 1 and 2. The reflective CPC that is the first stage 152 of the optical concentrator 150 may be formed as a hollow shell, e.g., a cavity within a solid body. The interior surfaces of the shell may be coated with a reflective material in some embodiments, such as those discussed above. The first stage 152 may be manufactured by injection molding or compression molding of glass, plastic or metal, and the inside surfaces are covered with a suitably reflective material. The cavity of the first stage 152 may be filled with air or a gas with a desired index of refraction. One advantage of using the two stage optical concentrator 150 is that the solid second stage 154 of high refractive index materials, such as sapphire or BK7, B270, SF10, SF57 or F2 glass, or a plastic such as Zeonex or Ultem, would be a smaller size than if the entire optical concentrator is solid. Accordingly, the cost of manufacturing would be reduced. Additionally, the second stage may include multiple layers of high refractive index materials, as indicated in FIG. 3A with dotted lines. For example, the second stage 154 may include a layer 156 of moderately high refractive index glass, a thin layer 158 of sapphire followed by another layer 160 of very high refractive index material, such as diamond (2.417) or GaP (3.4).

FIG. 3B illustrates another optical concentrator 200 that uses refractive lenses and includes two stages. The first stage of optical concentrator 200 is a meniscus lens 202 and the second stage is a dome lens 204, to which is mounted the wavelength converting element 110. The dome lens 204 may be manufactured from, e.g., BK7, B270, SF10, SF57 or F2 glass, sapphire, or plastic such as Zeonex or Ultem, or other material with an appropriate index of refraction. The meniscus lens 202 may be manufactured from, e.g., BK7, B270, SF10, SF57 or F2 glass, sapphire, plastic, acrylic, silicone, epoxy, or any other suitable material capable. Alternatively, the first stage may be another type of lens element, such as a Fresnel lens or a total internal reflection (TIR) lens. In one embodiment, the dichroic filter 206 is located between the meniscus lens 202 and the dome lens 204. Thus, it should be understood that the dichroic filter may be located in locations other than before the optical concentrator and is generally located between the light emitting device and the wavelength converting element.

Figure 4A:
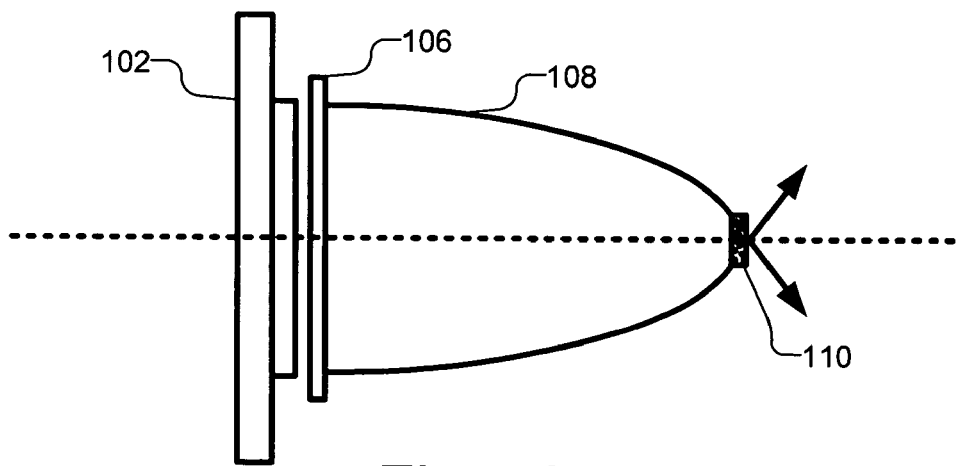
FIGS. 4A and 4B illustrate alternative embodiments of the light source that may be used with the present invention.
Figure 4B:
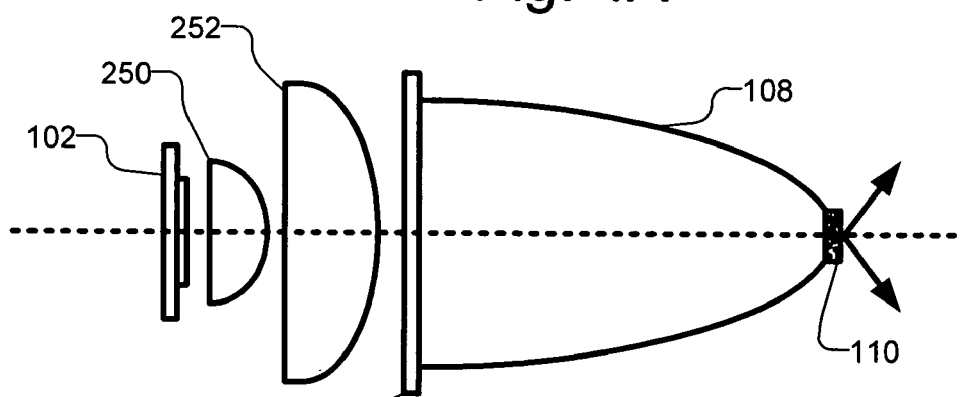

FIGS. 4A and 4B illustrate alternative embodiments of the light source that may be used with the present invention. FIG. 4A illustrates an embodiment, in which the light emitting device 102 is used without collection optics. The embodiment in FIG. 4A is similar to the configuration disclosed in U.S. application Ser. No. 10/804,314, entitled "Optical System for Light Emitting Diodes" by Matthijs H. Keuper et al., filed Mar. 19, 2004, which has the same assignee as the present application and is incorporated herein in its entirety. In the embodiment shown in FIG. 4A, only a portion of the emitted light is collected by the optical concentrator 108. However, if the optical concentrator 108 is designed for a limited angle acceptance, the radiance of the light emitting device 102 can still be maintained. In this case, the concentration power, i.e., the output area compared to input area, would be higher. The advantage of the embodiment illustrated in FIG. 4A is that the device is relatively simple to design and manufacture. However, a relatively larger light emitting device 102, i.e., larger array of LEDs, is required to make up for the loss in collection efficiency. Alternatively, an LED array with photonic crystals, DBR (Distributed Bragg Reflector), or resonant cavity LED that tailor the angular light distribution may be used.

FIG. 4B illustrates an embodiment in which additional lenses 250 and 252 are disposed between the light emitting device 102 and the optical concentrator 108. The additional lenses 250, 252 are used to illuminate the optical concentrator 108 with an image of the light emitting device 120. While two lenses are illustrated in FIG. 4B, it should be understood that only one lens or additional lenses may be used.

Figure 5A:
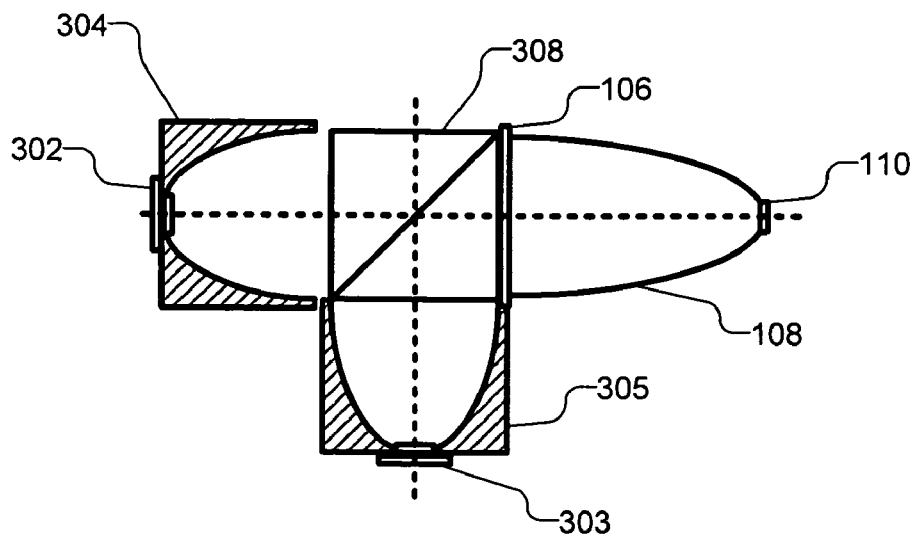
FIGS. 5A and 5B illustrate embodiments in which multiple pump light sources are used.
Figure 5B:
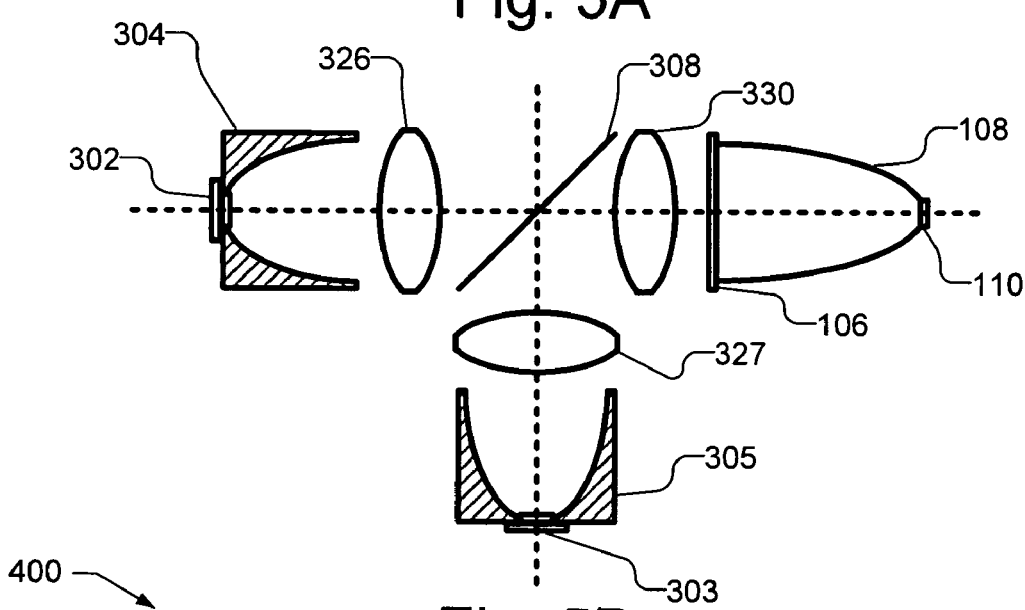

FIGS. 5A and 5B illustrate embodiments in which there are multiple pump light sources. FIG. 5A, for example, illustrates a first light emitting device 302 with an associated collection optic 304 and a second light emitting device 303 with an associated collection optic 305. The first light emitting device 302 may produce light having a first range of wavelengths (e.g., ultraviolet), and the second light emitting device 303 may produce light having a second range of wavelengths (green). A dichroic filter 308 passes the light from light emitting device 302 and reflects the light from light emitting device 303. The combined pump light is received by the optical concentrator 108 through dichroic filter 106. As discussed above, the dichroic filter 106 passes the pump light and reflects light emitted by the wavelength converting element 110. With the use of two light emitting devices 302, 303, the amount of pump light is advantageously doubled.

FIG. 5B shows an embodiment that is similar to that shown in FIG. 5A, except that Lenses 326 and 327 focus the light produced by light emitting devices 302 and 303, respectively, and a third lens 330 focuses the combined pump light on the optical concentrator 108 through dichroic filter 106.

Figure 6:
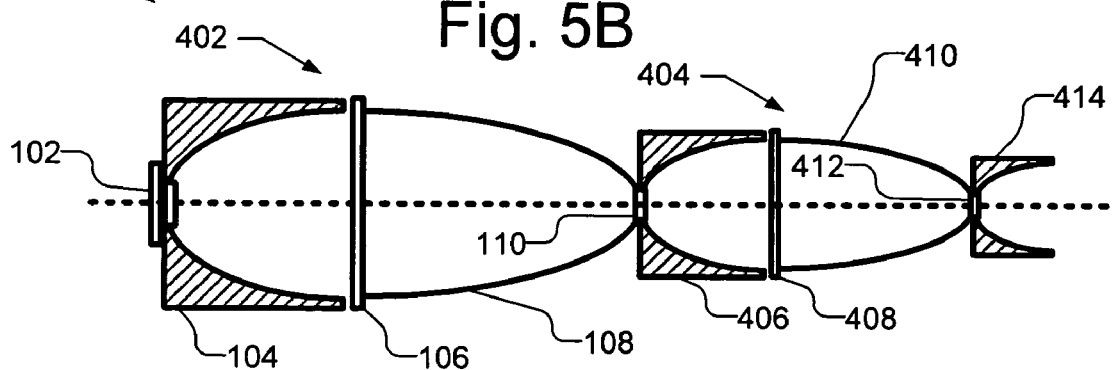
FIG. 6 shows an optical system that includes a series of collection optics and optical concentrators.

FIG. 6 shows an optical system 400 that includes a series of collection optics and optical concentrators. As illustrated, the optical system 400 includes a first section 402 with a light emitting device 102, collection optic 104, dichroic filter 106, optical concentrator 108 and wavelength converting element 110. The light emitting device 102 produces, e.g., ultraviolet pump light and the wavelength converting element 110 producing blue light. The second section 404 uses the wavelength converting element 110 as the light source, and includes a second collection optic 406, a second dichroic filter 408, a second optical concentrator 410 and a second wavelength converting element 412. In one embodiment, the second dichroic filter 408 may reflect at least a portion of the wavelengths of light converted or transmitted by the wavelength converting element 110, e.g., ultraviolet, so that that light is reflected back to the wavelength converting element 110 for a second pass. The use of the second collection optic 406 to reduce the cone angle of the light that passes through the wavelength converting element 110 improves the performance of the second dichroic filter 408. The second dichroic filter 408 may also reflect light emitted from the second wavelength converting element 412, e.g., green or red light. In one embodiment, a third collection optic 414 may be included to reduce the cone angle of the light from the second wavelength converting element 412.

Although the present invention is illustrated in connection with specific embodiments for instructional purposes, the present invention is not limited thereto. Various adaptations and modifications may be made without departing from the scope of the invention. Further, while particular types of materials are specified, such as BK7, B270, SF10, SF57 or F2 glass, sapphire, and a transparent plastic like Zeonex or Ultem, other materials including other glasses, plastics, or ceramics, may be used if desired. Further, it should be understood that the term "coupled" is used herein to mean either a direct connection between the items connected, or an indirect connection through one or more passive or active intermediary devices, whereas the term "connected" is used herein to mean a direct connection between the items connected, without any intermediate devices. Therefore, the spirit and scope of the appended claims should not be limited to the foregoing description.

What is claimed is:

1. An apparatus comprising:
   a light emitting element;
   an optical concentrator having an entrance surface and an exit surface, the entrance surface optically coupled to the light emitting element with no intervening optical collimating element disposed between the optical concentrator and the light emitting element, the optical concentrator concentrating the light received at the entrance surface to the exit surface which is smaller than the entrance surface;
   a wavelength converting material mounted on the exit surface of the optical concentrator, the wavelength converting material converting at least a portion of the light emitted by the light emitting element to a one or more wavelengths; and
   a dichroic filter disposed between the light emitting element and the wavelength converting element, wherein the dichroic filter reflects light emitted by the wavelength converting element having the one or more wavelengths;
   wherein the dichroic filter is disposed between the light emitting element and the optical concentrator so that light emitted from the light emitting element passes through the dichroic filter before reaching the entrance surface of the optical concentrator.

2. The apparatus of claim 1, wherein the light emitting element is a plasma light source.

3. The apparatus of claim 1, wherein the wavelength converting element emits converted light having the one or more wavelengths and unconverted light, the apparatus further comprising:
   a collection optic after the wavelength converting material, the collection optic reducing a cone angle of the light emitted by the wavelength converting material; and
   a second dichroic filter coupled to the collection optic with the collection optic between the second dichroic filter and the wavelength converting material, the second dichroic filter transmits at least a portion of at least one the converted light and the unconverted light and reflects at least a portion of at least one of the converted light and the unconverted light.

4. The apparatus of claim 1, wherein the optical concentrator comprises one or more refractive lenses.

5. The apparatus of claim 1, wherein the optical concentrator is a compound parabolic concentrator.

6. The apparatus of claim 1, wherein the wavelength converting material is disposed on the exit surface.

7. The apparatus of claim 1, wherein the wavelength converting material is a phosphor.

8. The apparatus of claim 1, wherein the light emitting element includes at least one of photonic crystals, Distributed Bragg Reflector and resonant cavity.

9. The apparatus of claim 1, wherein the light emitting element is at least one light emitting diode.

10. The apparatus of claim 9, wherein the light emitting element is an array of light emitting diodes.

11. The apparatus of claim 1, wherein the optical concentrator has an index of refraction of approximately 1.4 or higher and the wavelength converting material generates light into a medium with an index of refraction of approximately 1.0.

12. The apparatus of claim 11, wherein a layer is disposed between the wavelength converting material and the medium into which the wavelength converting material generates light.

13. The apparatus of claim 2, wherein the layer is at least one of a protective layer, a diffractive optical element, a hologram element, a dichroic filter, and a reflective polarizer.

14. The apparatus of claim 1, wherein the optical concentrator comprises reflective surfaces that define the exit surface through which light exits the optical concentrator, wherein the optical concentrator is shaped such that light received through the entrance surface of the optical concentrator is directed toward the exit surface.

15. The apparatus of claim 14, wherein the reflective surfaces of the optical concentrator are formed from a reflective material overlying a portion of the optical concentrator.

16. The apparatus of claim 14, wherein at least a portion of the optical concentrator is one of BK7 glass, B270 glass, SF10 glass, SF57 glass, F2 glass, Zeonex plastic, Ultem plastic, and sapphire.

17. The apparatus of claim 1, wherein the optical concentrator comprises:
a first element formed from a cavity within a solid body, the walls of the solid body are reflective, a first end of the first element defining the entrance surface of the optical concentrator and a second end of the cavity defining an exit surface of the first element; and
a second element formed from a solid transparent body with reflective sidewalls, the first end of the second element defining an entrance surface of the second element that is coupled to the exit surface of the first element, and a second end of the second element defining the exit surface of the optical concentrator.

18. The apparatus of claim 17, wherein the second element further comprises at least one additional layer of material on the solid transparent body, the at least one additional layer having a higher index of refraction than the solid transparent body.

19. The apparatus of claim 1, wherein the light emitting element is a first light emitting element, the apparatus further comprising:
a second light emitting element that emits light having different wavelengths from the light emitted by the first light emitting element; and
a dichroic beam splitter disposed to transmit the light emitted by the first light emitting element toward the optical concentrator and disposed to reflect the light emitted by the second light emitting element toward the optical concentrator.

20. The apparatus of claim 19, further comprising:
a first lens between the first light emitting element and the dichroic beam splitter;
a second lens between the second light emitting element and the dichroic beam splitter; and
a third lens between the dichroic beam splitter and the optical concentrator.

21. The apparatus of claim 1, wherein the etendue of an exit surface of the wavelength converting element is smaller than the etendue of the light emitting element.

22. The apparatus of claim 21, wherein the light emitted from the exit surface of the optical concentrator has an irradiance gain with respect to the light at the entrance surface of the optical concentrator.

23. A method comprising:
generating light having a first range of wavelengths;
transmitting the light through a first area with a first solid angle to produce a first etendue;
transmitting the light through a dichroic filter;
concentrating the light; and
converting at least a portion of the concentrated light to converted light having a second range of wavelengths, wherein the dichroic filter transmits light having the first range of wavelengths and reflects light having the second range of wavelengths, and wherein at least a portion of the converted light is emitted from a surface having a second area with a second solid angle to produce a second etendue, wherein the second etendue produced by the second area and second solid angle is equal to or smaller than the first etendue produced by the first area and first solid angle;
wherein light transmitted through the first area is collimated onto the dichroic filter and the light that is transmitted through the dichroic filter is concentrated onto a wavelength converting element that converts at least a portion of the concentrated light to the converted light having the second range of wavelengths.

24. The method of claim 23, wherein generating light comprises emitting light from one or more light emitting diodes.

25. The method of claim 23, further comprising collimating the light either reflectively or refractively before transmitting the light through a dichroic filter.

26. The method of claim 23, wherein concentrating the light is performed by refracting the light.

27. The method of claim 23, wherein concentrating the light is performed by reflecting the light.

28. The method of claim 23, wherein concentrating the light is performed in a compound parabolic concentrator.

29. The method of claim 23, wherein concentrating the light is performed in a medium with an index of refraction of approximately 1.4 or higher and the converted light is emitted into an medium with an index of refraction of approximately 1.0.

30. The method of claim 23, wherein concentrating the light is performed in one of a BK7 glass, B270 glass, SF10 glass, SF57 glass, F2 glass, Zeonex plastic, Ultem plastic, and sapphire element.

31. The method of claim 23, further comprising:
generating light having a third range of wavelengths;
combining the light having the third range of wavelengths with the light having the first range of wavelengths;
wherein transmitting the light through a dichroic filter transmits the combined light, concentrating the light concentrates the combined light and converting at least a portion of the concentrated light concentrates at least a portion of the concentrated combined light.

32. The method of claim 23, wherein the second area is smaller than the first area.

33. The method of claim 23, wherein the concentrated light has an irradiance gain with respect to the light transmitted through the first area.

34. The method of claim 23, wherein the light is concentrated through a dielectric material.

35. The method of claim 23, wherein the light is concentrated into an area that is smaller than the first area.

36. The method of claim 23, further comprising:
transmitting the converted light through a second dichroic filter;
concentrating the converted light;
converting at least a portion of the concentrated light to twice converted light having a third range of wavelengths, wherein the second dichroic filter transmits light having the second range of wavelengths and reflects light having the third range of wavelengths.

37. The method of claim 36, further comprising collimating the twice converted light either reflectively or refractively.

38. An apparatus comprising:
a light emitting element;
a collection optic having an entrance port that is optically coupled to the light emitting element to receive light emitted from the light emitting element, the entrance port of the collection optic having a first area into which light is accepted to produce a first etendue for the entrance port;
an optical concentrator having an exit port and is optically coupled to the collection optic, the optical concentrator concentrating the light received from the collection optic to the exit port;
a wavelength converting material mounted on the exit port of the optical concentrator, the wavelength converting material converting at least a portion of the light emitted by the light emitting element to one or more wavelengths, the wavelength converting material having an output surface that has a second area through which light is emitted to produce a second etendue, wherein the second area is smaller than the first area and wherein the second etendue is equal to or smaller than the first etendue; and
a dichroic filter disposed between the light emitting element and the wavelength converting element, wherein the dichroic filter reflects light emitted by the wavelength converting element having the one or more wavelengths.

39. The apparatus of claim 38, wherein the dichroic filter is disposed between the collection optic and the optical concentrator.

40. The apparatus of claim 38, wherein the light emitting element is at least one light emitting diode.

41. The apparatus of claim 38, wherein the optical concentrator is a compound parabolic concentrator.

42. The apparatus of claim 38, wherein the optical concentrator comprises refractive lenses.

43. The apparatus of claim 38, wherein the collection optic is at least one of an angle transformer, a condenser lens, a Fresnel lens, and a total internal reflection surfaces (TIR) lens.

44. The apparatus of claim 38, wherein the optical concentrator has an index of refraction of approximately 1.4 or higher and the wavelength converting material generates light into a medium with an index of refraction of approximately 1.0.

45. The apparatus of claim 44, wherein at least a portion of the optical concentrator is one of BK7 glass, B270 glass, SF10 glass, SF57 glass, F2 glass, Zeonex plastic, Ultem plastic, and sapphire.

46. The apparatus of claim 44, wherein a layer is disposed between the wavelength converting material and the medium into which the wavelength converting material generates light.

47. The apparatus of claim 46, wherein the layer is at least one of a protective layer, a diffractive optical element, a hologram element, a dichroic filter, and a reflective polarizer.

48. A method comprising:
generating light having a first range of wavelengths;
transmitting the light through a first area with a first irradiance;
transmitting the light through a dichroic filter;
concentrating the light, wherein the concentrated light has a second irradiance that is greater than the first irradiance; and
converting at least a portion of the concentrated light to converted light having a second range of wavelengths, wherein the dichroic filter transmits light having the first range of wavelengths and reflects light having the second range of wavelengths;
wherein light transmitted through the first area is collimated onto the dichroic filter and the light that is transmitted through the dichroic filter is concentrated onto a wavelength converting element that converts at least a portion of the concentrated light to the converted light having the second range of wavelengths.

49. The method of claim 48, wherein the light is transmitted through the first area with a first solid angle to produce a first etendue and wherein at least a portion of the converted light is emitted from a surface having a second area with a second solid angle to produce a second etendue and wherein the second etendue produced by the second area and second solid angle is equal to or smaller than the first etendue produced by the first area and first solid angle.

* * * * *